United States Patent [19]

Arase

[11] Patent Number: 4,615,429
[45] Date of Patent: Oct. 7, 1986

[54] DEVICE FOR ACCURATELY FORWARDING AND RETRIEVING ARTICLES

[75] Inventor: Akira Arase, Yokohama, Japan

[73] Assignee: Okamura Corporation, Yokohama, Japan

[21] Appl. No.: 473,145

[22] Filed: Mar. 7, 1983

[30] Foreign Application Priority Data

Aug. 6, 1982 [JP] Japan .................. 57-119488[U]

[51] Int. Cl.[4] .................................. B65G 47/26
[52] U.S. Cl. ............................ 198/456; 198/468.2; 198/468.9; 414/280
[58] Field of Search .............. 198/456, 786, 488, 487, 198/485, 486, 399, 400, 416, 468.9, 468.11, 468.2, 468.10; 414/57, 60, 280, 677; 193/44

[56] References Cited

U.S. PATENT DOCUMENTS

| | | | |
|---|---|---|---|
| 1,028,766 | 6/1912 | Montgomery | 198/416 |
| 1,546,520 | 7/1925 | Tytus | 198/416 |
| 1,931,453 | 9/1933 | Adams | 198/456 |
| 1,981,079 | 11/1934 | Shover | 198/485 |
| 2,030,816 | 2/1936 | Fenton | 198/456 |
| 2,779,490 | 1/1957 | Clarke et al. | 198/486 |
| 3,228,541 | 1/1966 | Crile et al. | 414/280 |
| 3,427,779 | 2/1969 | Goldman | 198/416 |
| 3,621,973 | 11/1971 | Carlson | 198/456 |
| 3,621,975 | 11/1971 | Vilen | 198/456 |
| 3,918,575 | 11/1975 | Carlson et al. | 198/416 |
| 4,111,412 | 9/1978 | Cathers | 198/456 |
| 4,203,694 | 5/1980 | James | 198/456 |

Primary Examiner—Robert J. Spar
Assistant Examiner—Jonathan D. Holmes
Attorney, Agent, or Firm—John Cyril Malloy

[57] ABSTRACT

A first set of parallel rollers are arranged in the longitudinal direction, and a second set of parallel rollers are also arranged in the longitudinal direction, lying substantially parallel to the first set of rollers and transversely spaced apart therefrom. A third set of parallel rollers are arranged somewhat obliquely to the longitudinal direction, and are located in the space between the first and second sets of rollers. First and second longitudinal guide plates extend approximately along the outsides of the first and the second sets of rollers respectively and project somewhat above their level. First and second transverse guide plates extend approximately along the front and rear ends of the first and the second sets of rollers and project somewhat above their level. Thus an object resting upon the rollers, by the revolution of the rollers, can be nestled against the corners between the longitudinal and the transverse guide plates, and can be accurately positioned.

6 Claims, 11 Drawing Figures

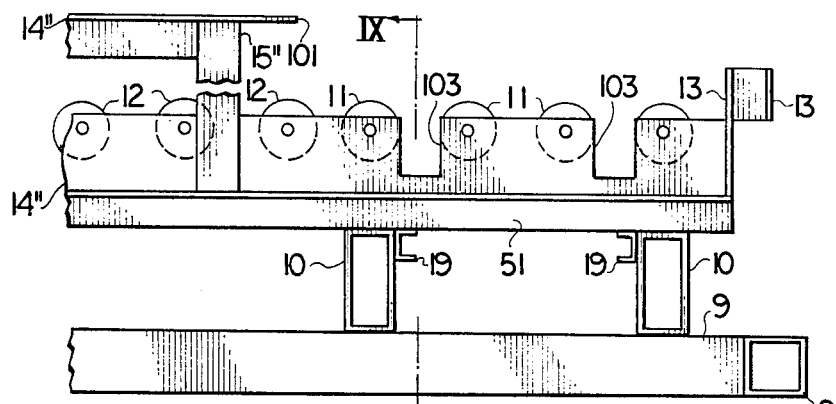
FIG. 3'
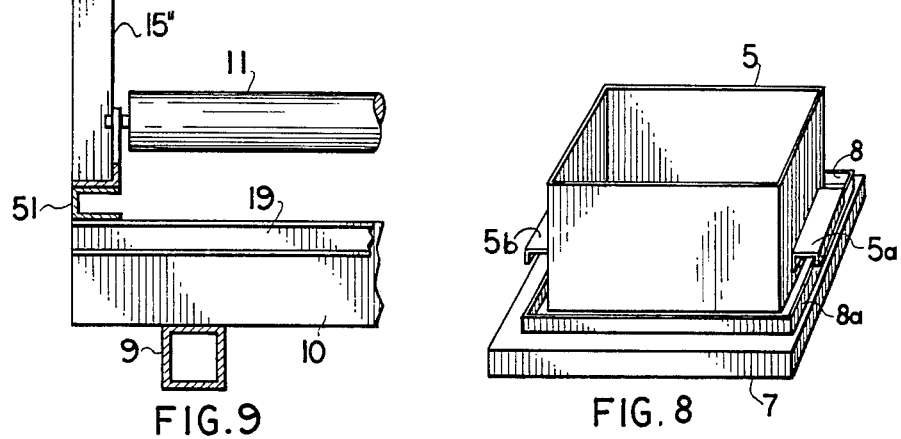
FIG. 9
FIG. 8
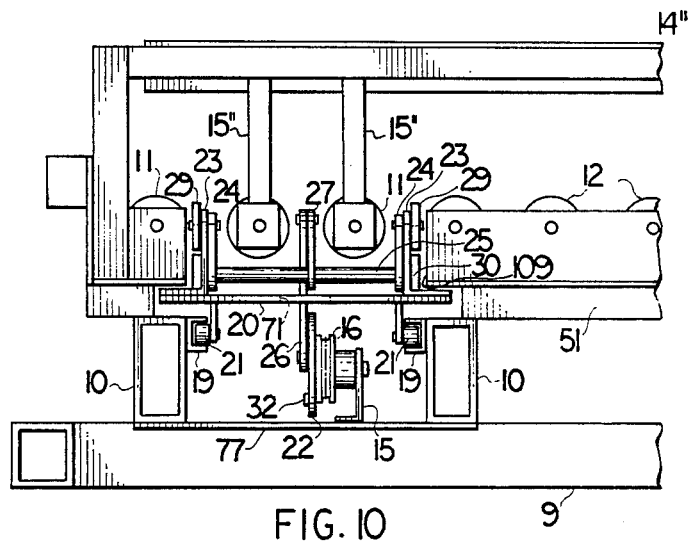
FIG. 10

DEVICE FOR ACCURATELY FORWARDING AND RETRIEVING ARTICLES

BACKGROUND OF THE INVENTION

The present invention relates to a device for accurately forwarding articles so that their position is accurately determined, which is reversible so as to retrieve articles in a reverse direction, also in an accurate manner and which in fact is particularly suitable for handling rectangular articles.

There is an already per se well known type of rotary multi shelf article storage warehouse, of the sort shown in plan view at the right hand side of FIG. 1 of the accompanying drawings and generally designated as "A", in which as mounted to a frame 1 there are provided a plurality of horizontally running track systems spaced apart in the vertical direction, only the topmost one of which can be seen in the figure. Each of these track systems comprises an outer rail 2 and a pair of inner rails 3 on the same level, each of the outer rails 2 being shaped as an oval, and each of the inner rails 3 being straight and being located within its outer rail 2 opposing a straight stretch thereof with corresponding points on said straight stretch of the outer rail 2 and the inner rail 3 being equidistant. The spacing between each contiguous pair of the track systems in the vertical direction is substantially equal. On each of the track systems there run a plurality of wheeled shelves 4, contiguous ones of which are linked one to the next by link plates 6 fixed to their lower bottoms so as to form a train, each of said trains being driven along its track system by a train drive means which is not shown in the figure. These wheeled shelves 4 are adapted to carry rectangular (in plan view) containers 5 which are adapted for carrying small objects or the like, not shown.

Such a rotary multi shelf type article storage warehouse A is convenient for storing a multiplicity of small objects in an organized manner, as for example in a manufacturing plant for electrical or mechanical machinery, but the problem has arisen that, since generally the available space for such a warehouse A is quite limited, therefore in order desirably to exploit this available space as effectively as possible, it is desirable to leave very little distance between the containers 5 and the wheeled shelves 4 on which they rest, i.e. to make the containers 5 as large as possible and to pack them as compactly as possible in the horizontal direction. Further, for the same reasons, it is desirable to leave as little vertical free space as possible between the top of each container 5 and the lower side of the track system next above said container 5, in other words to pack the containers as compactly as possible in the vertical direction. The problem then arises that very accurate positioning of a container 5 is then required in order to place it on its appropriate wheeled shelf 4 without difficulties arising from interference with the side of said wheeled shelf 4 or from other wheeled shelves 4, and accurate handling is similarly required in order to remove a container 5 from its wheeled shelf 4 without interference. Especially, such problems arise with respect to the higher stages of the article warehouse A, and it is difficult to place containers 5 on the upper wheeled shelves 4, and to retrieve said containers 5, easily.

SUMMARY OF THE INVENTION

Accordingly, it is an object of the present invention to provide a device for forwarding articles accurately, and for retrieving them equally accurately, which is suitable to be utilized for thus placing containers on their wheeled shelves in such a multi stage article warehouse and for retrieving said containers from said wheeled shelves, and whose operation is accurate enough to manage such forwarding and retrieving of the containers without causing undesirable interference, and which is furthermore efficient and reliable, yet simple and cheap to manufacture.

According to the present invention, this and other objects are accomplished by a device for accurately forwarding and retrieving articles, comprising: (a) a first set of a plurality of parallel rollers arranged in the longitudinal direction; (b) a second set of a plurality of parallel rollers arranged in the longitudinal direction, said second set of rollers lying substantially parallel to said first set of rollers and being transversely spaced apart therefrom; (c) a third set of a plurality of parallel rollers arranged somewhat obliquely to the longitudinal direction, located in said space between said first and second sets of rollers; (d) first and second longitudinally extending guide plates extending approximately along the outsides of the first and the second sets of rollers respectively and projecting somewhat above their level; and (e) first and second transversely extending guide plates extending approximately along the front and rear ends of the first and the second sets of rollers and projecting somewhat above their level.

According to such a device, an object resting upon the longitudinal and the oblique rollers, by the revolution of the rollers, can be nestled against the corners between the longitudinal and the transverse guide plates, and can be accurately positioned.

BRIEF DESCRIPTION OF THE DRAWINGS

The present invention will now be shown and described with reference to a preferred embodiment thereof, and with reference to the illustrative drawings. In the drawings, like parts and features are denoted by like reference symbols in the various figures thereof, and:

FIG. 3' is an end view taken along line III'—III' of FIG. 2 in partial cutaway with background structural components removed for purposes of clarity.

FIG. 8 is an isometric view of a container and carrying tray.

FIG. 9 is a sectional view of the disclosed structure of FIG. 3′ taken along line IX—IX of FIG. 3′.

FIG. 10 is an end view taken along line X—X of FIG. 7 wherein certain background components including the container is removed for purposes of clarity.

DESCRIPTION OF THE PREFERRED EMBODIMENT

Figure 1:
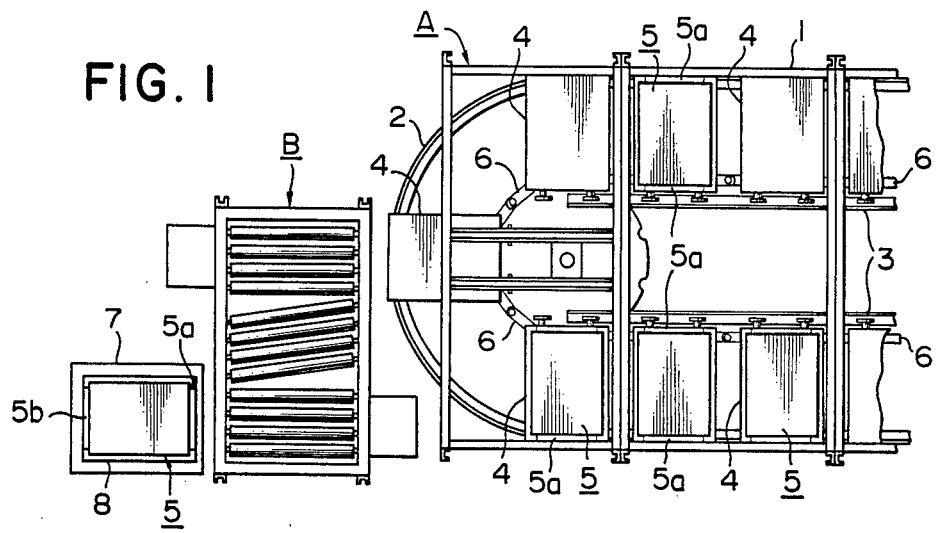
FIG. 1 is a plan view of an article storage warehouse, of an article forwarding and retrieving device which is a preferred embodiment of the present invention, of a serving tray therefor, and of two article moving devices used therewith.

The present invention will now be described with reference to the preferred embodiment thereof, and with reference to the appended drawings. FIG. 1 shows in plan view the article warehouse A, already explained, and also shows in plan view an assembly B, which incorporates the article forwarding and retrieving device which is the preferred embodiment of the present invention, and also incorporates two article moving devices associated therewith. In fact, although it is not so shown in the figures, the assembly B incorporating the article forwarding and retrieving device and the two article moving devices is controllably movable in the vertical direction by a drive means which is not shown, so as to access the desired one of the vertically stacked track systems of the article storage warehouse A by being opposed thereto. FIGS. 1 and 8 also shows a serving tray 8 which is mounted on a tray base 7 which is fixed to the ground or to a fixed member. This serving tray 8 is similar to one of the moving wheeled shelves 4, and is shown as carrying a container 5 which is to be forwarded for storing on a particular one of the wheeled shelves 4 which has been brought to the front of the article storage warehouse A. Each of the containers 5 in fact is provided at its end surfaces with a pair of protruding lips 5a for being grasped thereby, as will be explained in detail later. In this connection, henceforth the left hand side in FIG. 1 of the general assembly will be spoken of as its front, its lower side in FIG. 1 will be spoken of as its right hand side (the assembly being considered as viewed from the front), its upper side in FIG. 1 will be spoken of as its left hand side, and its right hand side in FIG. 1 will be spoken of as its rear, as occasion demands.

Figure 2:
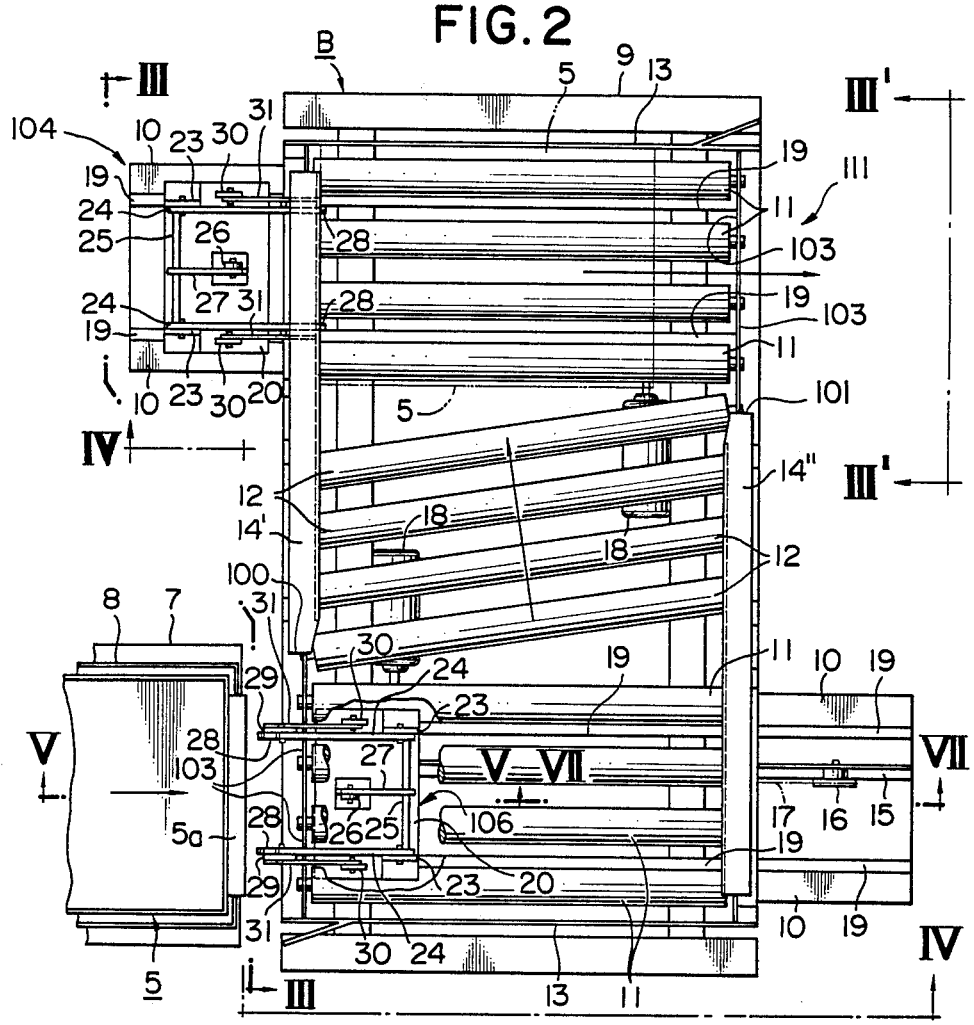
FIG. 2 is a more detailed plan view, showing the article forwarding and retrieving device and the serving tray and the article moving devices in more detail.
Figure 3:
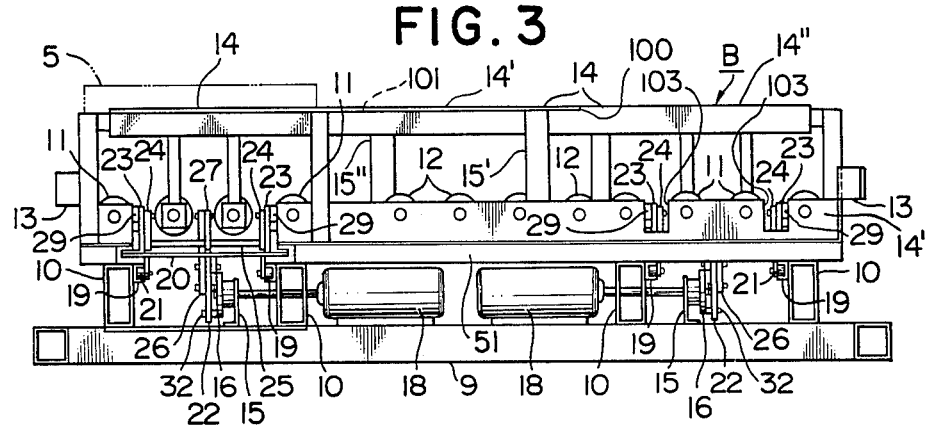
FIG. 3 is a frontal elevational view of the article forwarding and retrieving device and of the article moving devices, as seen in the direction shown by the arrows III in FIG. 2.

The assembly B is formed with a rectangular base frame 9, as seen in FIG. 2, and this frame 9 incorporates four longitudinally (i.e. fore and aft) extending rod members 10, two whereof are provided on one side of the assembly B and two whereof are provided on the other side of said assembly B, as best seen in section in FIG. 3. The rod members 10 project to the front and to the rear of the assembly B. Generally above each of these pairs of rod members 10 there is provided a set of parallel longitudinally extending rollers 11 as being incorporated. These rollers 11 are all selectively rotatable about their central axes by motor means not shown in the figure. To the central portion of the frame 9, between the two pairs of rod members 10 and between these two sets of longitudinal rollers 11, there is provided a set of oblique rollers 12, which are all parallel to one another, but which are all angled by a certain angle to the fore and aft direction of the apparatus, extending generally in the front right to rear left direction. These oblique rollers 12 also are all selectively rotatable about their central axes by motor means not shown in the figure.

On one side of the apparatus just to the right of the rightmost one of the one set of longitudinal rollers 11 there is provided a longitudinally extending guide plate 13 which projects to a certain extent vertically, and similarly on the other side of the apparatus just to the left of the leftmost one of the other set of longitudinal rollers 11 there is provided a longitudinally extending guide plate 13 which projects to a certain extent vertically.

The front ends of the longitudinal rollers 11 and of the oblique rollers 12 are all located at approximately the same longitudinal position. Along the front of the frame 9 there is provided, substantially just in front of these front ends of the rollers, a guide plate 14′ which extends in the transverse direction and projects vertically upwards to a certain extent. Similarly, the rear ends of the longitudinal rollers 11 and of the oblique rollers 12 are all located at approximately the same longitudinal position, and along the rear of the frame 9 there is provided, substantially just behind these rear ends of the rollers, a guide plate 14″ which also extends in the transverse direction and projects vertically upwards to a certain extent.

Between each pair of rod members 10 and parallel therewith there is provided a mounting plate 15 which extends in the longitudinal direction. On each of these mounting plates 15 there are provided a pair of sprockets 16, around which there is wound an endless chain 17, which is selectively driven by a speed reduction type motor 18 mounted on the frame 9. Support rails 19 are mounted to the upper inwardly facing and opposed portions of each of the rod members 10, and these support rails 19 are shaped as channel sections with their open sides facing inwards. Two running plates 20 are provided with small rollers 21 pivoted to and projecting laterally from their under surfaces which are engaged into the channel sections of the support rails 19, and thereby the running plates 20 are mounted to the frame 9 so as to be slidable along the top thereof in the longitudinal direction. It is arranged that each of these running plates 20 can slide freely just over the top of the corresponding longitudinal rods 10 without fouling thereagainst.

Now, to describe the arrangements relating to the right hand running plate 20, a first connecting bar 22 is provided, the upper end of which is pivotally connected to the front end of this running plate 20, and the lower end of which is pivotally connected to a point on the corresponding endless chain 17. Thus, by the operation of the appropriate one of the motors 18, the right hand running plate 20 can be driven forwards and backwards, so as to be moved under its corresponding longitudinal rollers 11 or to be backed thereoff by being positioned over the projecting portions of its rod members 10. From the top surface of the running plate 20 there project upwards between the rollers 11 two parallel opposed first mounting plates 23, and the rear ends of two parallel opposed swing arms 24 are pivotally attached to opposed points on the upper ends of these mounting plates 23 on their insides. Lower points on the rear ends of these swing arms 24 are connected rigidly together by a connecting rod 25 which extends in the transverse direction under the rollers 11, as may be seen in FIGS. 2 and 3. Thus the two swing arms 24 are constrained to pivot together. The lower end of a second connecting bar 26 is pivotally connected to an intermediate point on the first connecting bar 22. This second connecting bar 26 passes freely upwards through a hole cut in the running plate 20, and its upper end is pivotally connected to the front end of a third connecting bar 27, the rear end of which is fixedly connected to an intermediate point along the connecting rod 25 between two of the rollers 11, so as to control the movements of the swing arms 24.

The upper front ends of the swing arms 24 are formed with engaging hook 28 facing upwards, and slightly rearwards of each of these hook shapes 28 there is pivotally attached to each of the swing arms 24 the central portion of a retainer hook member 29, the upper end of which is formed as a retainer hook shape. From the top surface of the running plate 20 there also project upwards between the rollers 11 two parallel opposed second mounting plates 30, and the rear ends of two parallel opposed fourth connecting bars 31 are pivotally attached to opposed points on the upper ends of these mounting plates 30 on their insides. The front ends of these fourth connecting bars 31 are attached to the corresponding lower ends of the retainer hook members 29, so as to control the movements of these retainer hook members 29.

The arrangements on the left hand running plate 20 are similar, but reversed in the front to rear directions, as shown in FIG. 2.

Now, the device described above is operated to store a container 5 in the storage warehouse A as follows.

First, the container 5 containing articles to be stored or the like is placed by an operator on the serving tray 8 mounted on the tray base 7. At this time, the container 5 is securely retained on this serving tray 8 by an end lip 8a a provided thereon. Then the assembly B is lowered so that the front ends of the right side longitudinal rollers 11 oppose said serving tray 8, with the sprockets 16 and the endless chain 17 of the right hand running plate assembly being positioned so that the lower end of the first connecting bar 22 is positioned at a position just corresponding to the lower extremities of the front one of said sprockets 16, so that the various members are in their positions as seen in FIG. 5 with the hooks 28 of the swing arms 24 below the level of the tops of the longitudinally extending rollers 11, and with the retainer hook members 29 pivoted backwards away from said hook shapes 28.

Figure 5:
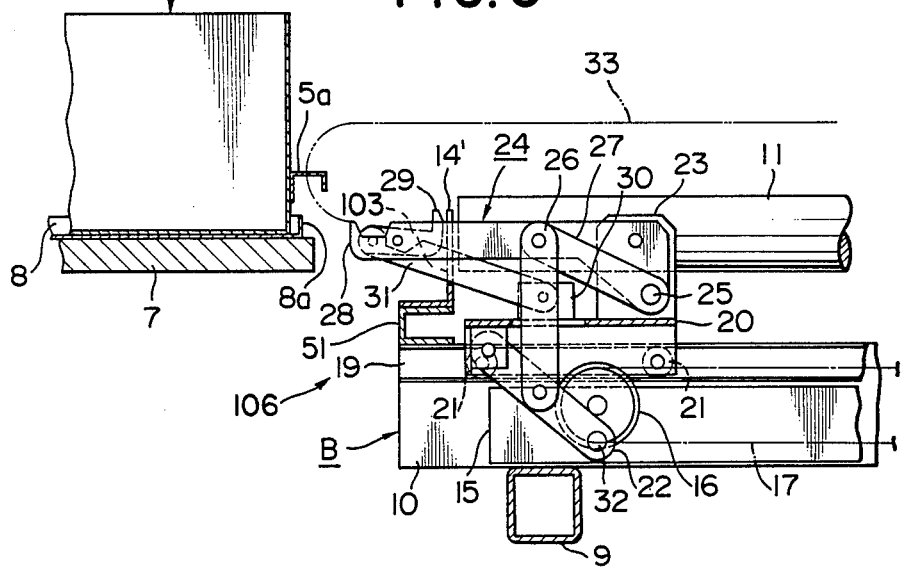
FIG. 5 is a somewhat schematic sectional view of the apparatus as seen in the direction indicated by the arrows V in FIG. 2, showing a container about to be pulled onto the apparatus by a gripping hook mechanism.
Figure 6:
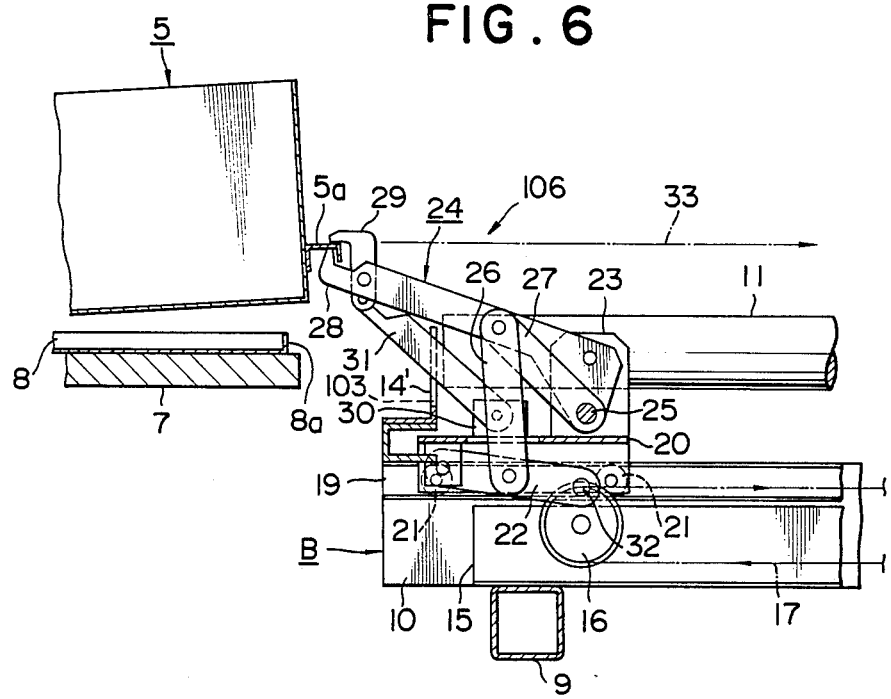
FIG. 6 is a somewhat schematic sectional view, similar to FIG. 5, as seen in the direction shown by the arrows V in FIG. 2, showing the container being pulled onto the apparatus by the hook mechanism.

Next, the sprockets 16 are rotated in the clockwise direction as seen in FIG. 5, so that via the first connecting bar 22 the running plate 20 is first shifted a little forwards along the support rails 19 and is then shifted backwards, with the hook shapes 28 of the swing arms 24 pursuing a locus as shown by the double dotted lines 33 in FIGS. 5 and 6, in the clockwise direction, and with the various members moving between the rollers 11. Thus, these hook shapes 28 are brought forwards under the protruding lip 5a of the container 5 on the serving tray 8, and are then raised up, so as to engage this projecting lip 5a and so as to raise the rear end of the container 5 sufficiently to clear the lip 8a of the serving tray 8, as shown in FIG. 6; and at the same time, by the construction of the various members as described above and as shown in the figures, including the particular arrangement of the proportions of the lengths of the various members, the fourth connecting bars 31 pull the lower ends of the retainer hook members 29 so as to rotate these members 29 in the counterclockwise direction, which thus engages the retainer hook members 29 over the upper side of the protruding lip 5a of the container 5, again as shown in FIG. 6. Thereby the container 5 is securely gripped by the hooks 28 and the retainer hook members 29. This gripping will be complete when the sprockets 16 and the endless chain 17 of the right hand running plate assembly are so positioned, as seen in FIG. 6, that the lower end of the first connecting bar 22 is positioned at a position just corresponding to the upper extremities of the front one of said sprockets 16.

Figure 7:
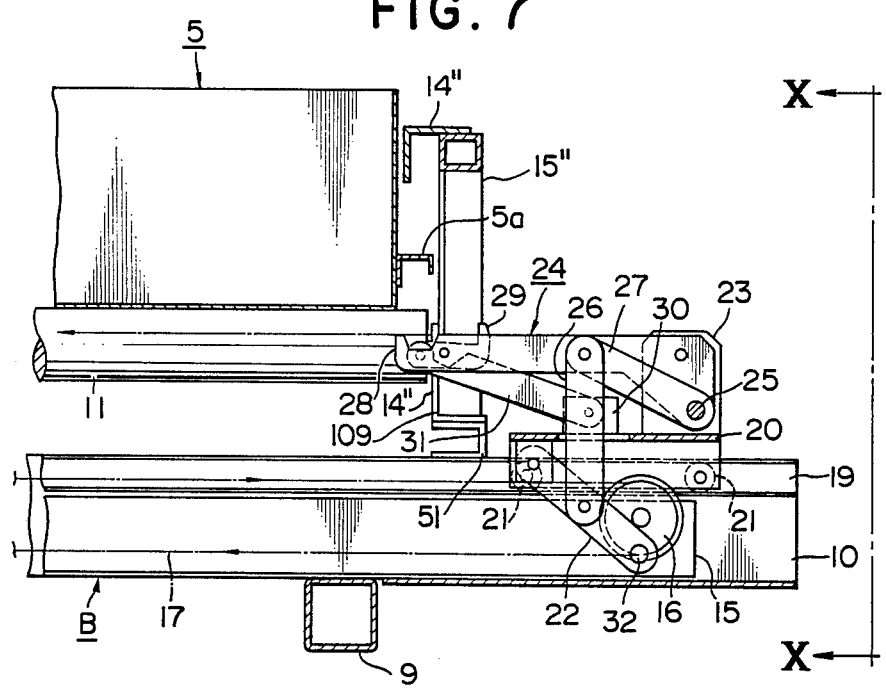
FIG. 7 is a somewhat schematic sectional view, as seen in the direction shown by the arrows VII in FIG. 2, showing the container being released to rest on the apparatus by the hook mechanism.

Next, as the sprockets 16 and the endless chain 17 are further rotated in the clockwise direction as seen in FIGS. 5 and 6, the assembly upon the running plate 20 is shifted backwards with respect to the frame 9, so as to pull the container 5 by its lip 5a off the serving tray 8, over its lip 8a which was formerly retaining the container 5 securely thereon, and over the front ends of the rollers 11. The container 5 is therefore pulled onto the tops of the right hand side set of longitudinal rollers 11. At this time, the action of the retainer hook members 29 ensures that the container 5 is not substantially tilted, but is securely gripped, so that the articles stored in this container 5 do not become unevenly distributed. Next, the rearwards motion of the assembly upon the running plate 20 continues until, as seen in FIG. 7, the first connecting bar 22 runs around the rear one of the sprockets 16, at which time the action described above is reversed, so that, in the final position as shown in FIG. 7 when the sprockets 16 and the endless chain 17 of the right hand running plate assembly have become so positioned that the lower end of the first connecting bar 22 is positioned at a position just corresponding to the lower extremities of the rear one of said sprockets 16, as will be easily understood by one of ordinary skill in the art based upon the above disclosure, the gripping of the lip 5a of the container 5 by the hook shapes 28 and the retainer hook members 29 is released, with the container 5 resting fully upon the right hand side set of longitudinal rollers 11, and with its rear side abutting against the rear guide plate 14. At this time, the members 24 and 31, etc., have come down between the rollers 11.

Next, particularly according to the operation of the article forwarding and retrieving device according to the present invention, the right hand set and the left hand set of the longitudinal rollers 11 are rotated by the means which is not particularly shown, so that their upper surfaces move in the leftwards direction; and also the set of oblique rollers 12 are rotated so that their upper surfaces move generally in the leftwards direction but also to a certain extent in the forwards direction. Thereby, the container 5 which initially is resting on the right hand set of longitudinal rollers 11 is first shifted straight to the left by these right hand rollers 11, sliding along the rear guide plate 14, and is then shifted to the left and somewhat in the forward direction by the oblique rollers 12, so that its front face comes to contact and slide against the front guide plate 14. Subsequently, by the subsequent action of the oblique rollers 12 and next by the action of the left hand set of longitudinal rollers 11, the container 5 is moved further to the left, sliding along the front guide plate 14, until its leftward movement is stopped by the longitudinally extending left guide plate 13, at which time the container 5 is nestled squarely against the left front corner of the rectangular shape defined by the four guide plates 13 and 14, i.e. the upper left corner as seen in FIG. 2, and is thus very accurately positioned. This position is shown in FIG. 2 by the double dotted lines. This positioning action is made substantially more practicable by the fact that the container 5 is rectangular in plan view.

Meanwhile, during this operation or before or after it, the assembly B has been raised so that the rear ends of the left side longitudinal rollers 11 oppose the one of the wheeled trays 4 in the article warehouse A on which it is desired to place the container 5, said one of the wheeled trays 4 having also meanwhile been shifted by its train drive means to the front of said article warehouse A. Next, by the operation of the article moving device incorporating the left side running plate 20, which operates similarly to the above described operation by gripping the other projecting lip 5b formed on the front surface of the container 5, the container 5 is smoothly and accurately slid rearwards on the left hand set of longitudinal rollers 11, and is put onto said appropriate one of the wheeled trays 4 in the article storage warehouse A; the details will be clear to one of ordinary skill in the art, based upon the above disclosure. The accurate positioning of the container 5 at the end of the sideways moving process described above, by being nestled against the left front corner of the rectangular shape defined above, is very important for achieving this, due to the severe constraints placed upon the positioning of the container 5 due to compact packing in the article warehouse A.

The operation of the device described above for retrieving a particular one of the containers 5 from the article storage warehouse A, and for placing it upon the serving tray 8, is just the reverse of the one described above, and again will be clear to one of ordinary skill in the art, based upon the above disclosure. During this reverse process, the right hand set and the left hand set of the longitudinal rollers 11 are rotated by the drive means so that their upper surfaces move in the rightwards direction, and the set of oblique rollers 12 are rotated so that their upper surfaces move generally in the rightwards direction and also to a certain extent in the rearwards direction. Thereby, the container 5 which initially is resting on the left hand set of longitudinal rollers 11 is first shifted straight to the right by these left hand rollers 11, sliding along the front guide plate 14, and is then shifted to the right and somewhat in the rearward direction by the oblique rollers 12, so that its rear face comes to contact and slide against the rear guide plate 14. Subsequently, by the subsequent action of the oblique rollers 12 and next by the action of the right hand set of longitudinal rollers 11, the container 5 is moved further to the right, sliding along the rear guide plate 14, until its rightward movement is stopped by the longitudinally extending right guide plate 13, at which time the container 5 is nestled squarely against the right rear corner of the rectangular shape defined by the four guide plates 13 and 14, i.e. the lower right corner as seen in FIG. 2, and is thus again very accurately positioned.

Thus, since the device according to the present invention described above accurately and precisely positions the object, i.e. the container 5, which is being forwarded to be stored in the article storage warehouse A or which is being retrieved therefrom, it is suitable for use with a tightly packed storage warehouse A in which little spare room is available between the containers 5, both in the horizontal and in the vertical directions. However, the present invention could be utilized in other possible contexts, and is not to be considered as limited to use with an article warehouse of the sort described above. Further, although the present invention has been described as integrated with the two article moving devices incorporating the running plates 20, in fact this is not to be considered as limitative of the broadest concept of the present invention, since these article moving devices could be provided as separate from the frame 9 on which the rollers 11 and 12 are mounted.

By way of summary, a container 5 is handled by a pushing and pulling means including a pulling mechanism 106 and a pushing mechanism 104 located at opposite ends of what may be considered a path of travel of the article being handled. The path of travel is defined by a plurality of rollers including a first set of parallel rollers located adjacent to the pulling mechanism 106, a second set of parallel rollers 11 located adjacent and in communicating relation with the pushing mechanism 104. The path of travel of the article over the plurality of rollers is further defined by an oblique set of rollers 12 located in the space between the first and second set of parallel rollers wherein the oblique rollers are angularly oriented relative to the second set of rollers so as to direct the article being handled into the corner and away from an article exit from the path of travel. The corner farthest from the article exit is defined by the junction of one of two guide rails 14 indicated as 14' for purposes of clarity and the transverse guide rail 13 located adjacent thereto at the top of FIG. 2. The article or particular container 5 being handled enters onto the first set of rollers 11 by being pulled thereon by the pulling mechanism 106 through an article entrance substantially defined at one open end of the first set of parallel rollers and more specifically defined by the distance between an end 100 of guide rail 14' and the transverse guide rail 13 located at the bottom of FIG. 2. As set forth above, the hook portions 28 and 29 are defined on each of the pulling mechanism 106 and the pushing mechanism 104 and designed to engage in grasping fashion the projecting lip 5a (pulling mechanism 106) and the projecting lip 5b (pulling mechanism 104). As clearly shown in FIG. 8, the projecting lips 5a and 5b are located on opposite sides of the container or article being handled.

With further reference to FIG. 2, a lower left portion of FIG. 2 shows that the article entrance is defined by an open space extending beyond the end 100 of guide plate 14'. The guide plate 14' terminates well before it would enter into interruptive engagement with the pulling mechanism 106. Cutout portions 103 are formed in lower portion of the guide plate 14' so as to provide clearance for the hook portions (see FIGS. 3 and 5). Similarly, as shown in FIG. 3', openings 103 are provided in the lower portion 14" of the guide plate so as to provide clearance of the hook portions or more particularly, the arms 31 supporting the hook portions as they pass through the lower portion of the guide plate 14" as again indicated by 103.

Figure 4:
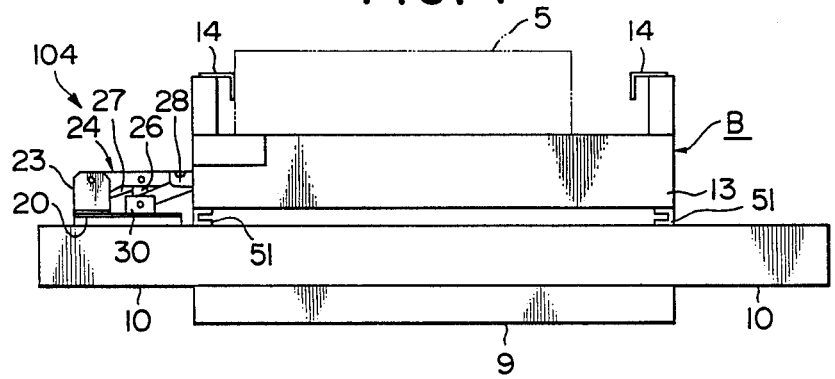
FIG. 4 is a schematic side view of the apparatus with a container 5 being forwarded thereby, as seen in the direction shown by the arrows IV in FIG. 2.

With reference to FIG. 4, it is clearly shown that the pulling mechanism 106 travels beneath the plates 14 and the first set of rollers 11 when in its downwardly extended non-hooking position. The pushing mechanism 104 assumes its downwardly folded position traveling underneath guide plate 14' located along the left margin of the mechanism B in FIG. 2 and continues such travel underneath the second set of rollers 11 until it reaches the unobstructed area or article exit 111 (see FIG. 2).

Guide plate 14" terminates at end 101 well short of interruptive positioning relative to the container 5 or article being handled and now being removed from the path of travel of mechanism B and more specifically the open end or article exit 111 by the pushing mechanism 104.

Further by way of explanation, the respective hooking structures or elements 28 and 29 are not in their grasping or engaging position with regard to the respective lips 5a and 5b of the container 5, and therefore do not project upwardly through the respective first and second sets of rollers 11 until they are in the area of the article entrance or article exit 111 respectively. In these respective areas there is no conflict or interruptive positioning between the hooking mechanism and the respective guide plates 14' and 14" since each of their extremities 100 and 101 respectively terminate before such interruptive positioning is possible.

What is claimed is:

1. A device for accurately forwarding and retrieving articles, comprising:
   (a) a plurality of rollers collectively disposed to define a path of travel for articles being handled, said path of travel extending from an article entrance at one end of said path of travel to an article exit at an opposite end of said path of travel.
   (b) said plurality of rollers comprising a first set of parallel rollers disposed at said one end of said path of travel and in receiving relation to said article entrance,
   (c) said plurality of rollers further comprising a second set of parallel rollers spaced from said first set of rollers and disposed at an opposite end of said path of travel relative to said one end and adjacent to said article exit,
   (d) a third set of rollers disposed between said first and said second sets of rollers and obliquely oriented relative to said first and second sets at an angle sufficient to direct an article traveling along said path of travel onto said second set of rollers from said third set of rollers and substantially away from said article exit,
   (e) a first and a second elongated guide plate each disposed in spaced substantially parallel relation to one another on opposite sides of said path of travel,
   (f) said first guide plate extending along one end of said first set of rollers from said one end of said path of travel towards said opposite end of said path of travel and spaced from said opposite end by said article exit,
   (g) said second guide plate extending along one end of said second set of rollers from said opposite end of said path of travel towards said one end of said path of travel and spaced from said one end by said article entrance,
   (h) a pulling and pushing means for moving the article on and off said plurality of rollers and including a pulling mechanism mounted adjacent said article entrance and a pushing mechanism mounted adjacent said articles exit, said pulling mechanism and said pushing mechanism respectively disposed and structured to pull an article onto said first set of rollers through said article entrance and push an article off said second set of rollers through said article exit,
   (i) said pulling mechanism and said pushing mechanism each including an engagement hook and a retaining hook structured for respectively grasping an under and an upper portion of a projecting lip on each of the articles for partially lifting the article and positioning the article on and off said plurality of rollers respectively, and
   (j) an endless belt associated with each of said pulling mechanisms and pushing mechanism, each of said belts moving said respective engagement hook and retaininer hook to and fro between grasping and non-grasping positions relative to articles being moved thereby, each of said endless belts mounted generally parallel to the longitudinal axis of the rollers of said first and second sets of rollers and generally underneath a respective one of said sets.

2. A device for forwarding and retrieving articles according to claim 1, further comprising means for rotating said plurality of rollers selectively in either rotational direction.

3. A device as in claim 1 wherein said first guide plate is disposed in spaced and opposed relation to said article entrance and in interruptive relation to articles passing on said first set of rollers through said article entrance; said second guide plate being disposed in spaced and opposed relation to said article exit and in interuptive relation to articles passing onto said second set of rollers from said third set of rollers.

4. A device for forwarding and retrieving articles according to claim 3, further comprising means for rotating said plurality of rollers selectively in either rotational direction.

5. A device as in claim 1 wherein said third set of rollers comprises a first and a second end each disposed on opposite sides of said path of travel and respectively adjacent said first guide plate and said second guide plate, said first end of said third set of rollers disposed closer to said article exit than said article entrance and said second end of said third set of rollers disposed closer to said article entrance than said article exit.

6. A device as set forth in claim 1 further comprising first and second sprockets around which each of said endless belts is mounted and between which respective ones of said endless belts are extended; and wherein said engagement hook and said retainer hooks are respectively raised up and engaged and respectively lowered down and disengaged by the travel of said respective ones of said endless belts around said first sprocket and said second sprocket.

* * * * *